April 7, 1953  W. R. RODGER ET AL  2,633,938
HAND BRAKE
Filed June 18, 1947
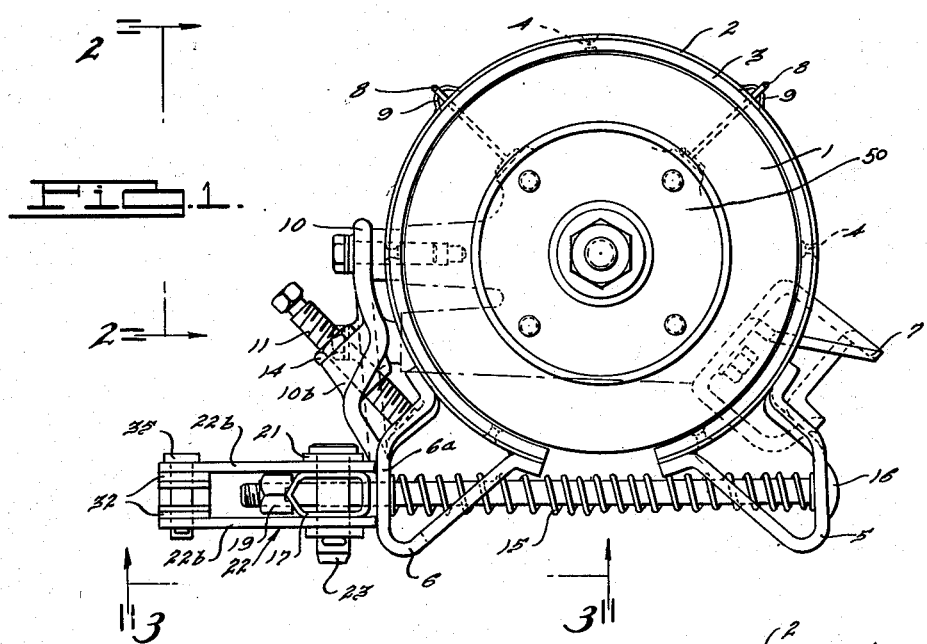
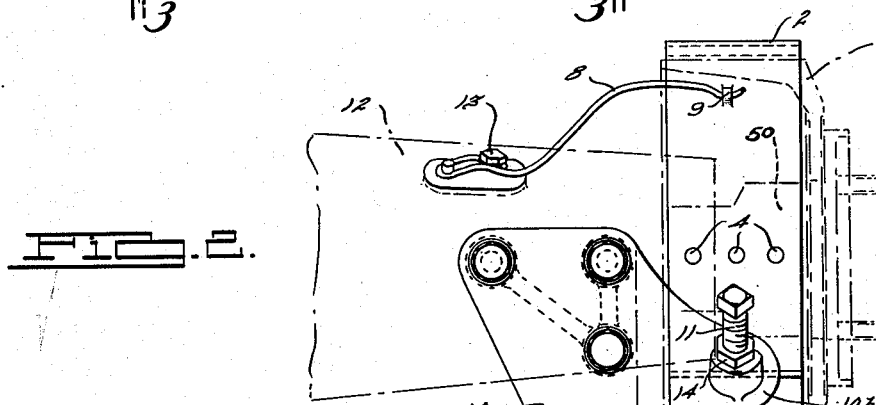
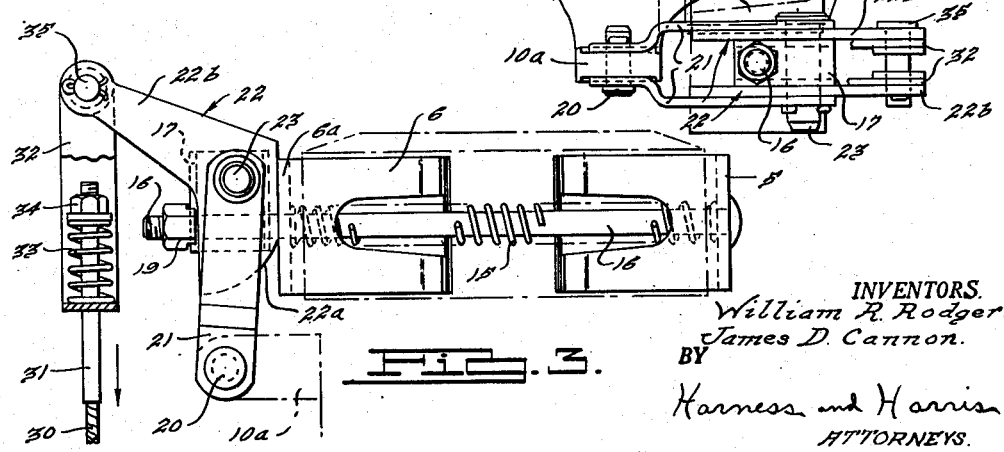
INVENTORS.
William R. Rodger.
James D. Cannon.
BY
Harness and Harris
ATTORNEYS.

Patented Apr. 7, 1953

2,633,938

UNITED STATES PATENT OFFICE 2,633,938

HAND BRAKE

William R. Rodger and James D. Cannon, Detroit, Mich., assignors to Chrysler Corporation, Highland Park, Mich., a corporation of Delaware Application June 18, 1947, Serial No. 755,354

6 Claims. (Cl. 188—77)

Our invention relates to improvements in automobile brakes and particularly to that type of hand operated brake which is mounted in proximity to and supported by the transmission casing of an automobile so as to brake on a drum mounted on the drive shaft.

Prior to our invention it has been common practice to mount a drive shaft brake band with the mid-point between the ends of the brake band anchored by a bracket or the like to one side of the transmission casing and with the ends of the brake band at the opposite side of the transmission casing operably connected to some form of linkage or lever system such that the ends of the band may be drawn together so as to wrap the band around the drive shaft brake drum when the brake is applied. In a construction of this type the effective braking area of the brake band is limited to substantially one half of the length of the brake band due to the brake band being fixedly anchored at its mid-length which prevents movement of the entire brake band about the brake drum when a braking force is applied to the ends of the brake band.

It is one of the objects of our invention to provide an improved drive shaft brake in which a maximum braking effect may be accomplished with the application of a minimum braking force due to the brake band being so mounted that the entire length of the brake band is wrapped about the brake drum when a braking force is applied. This full wrap of our brake band about the brake drum is completely effective regardless of the direction of rotation of the drive shaft brake drum.

Another object of our invention is to provide an improved hand brake having a full wrap brake band in combination with a compensating device to eliminate any slip that might develop as the brake is applied.

Another object of this invention is to provide a drive shaft hand brake of an improved and simplified design which requires a minimum of parts and in which the effective braking area is substantially twice that usually provided in a brake of this type.

Another object of this invention is to provide a compensating device for hand brakes which prevents any slip or reduction in braking effect during application of the brake.

For the purpose of disclosing our invention, we have illustrated a preferred embodiment thereof in the accompanying drawings, in which:

Fig. 1 is a rear end elevation of our brake mechanism applied to an automobile drive shaft;

Fig. 2 is a side elevation of our brake mechanism taken in the direction of the arrows 2—2 of Fig. 1;

Fig. 3 is a bottom plan view of the brake mechanism taken along the lines 3—3 of Fig. 1.

The numeral 1 represents a transmission brake drum secured at its center to a rotatable drive shaft 50. The brake comprises a brake band 2 lined with suitable brake lining material 3, which is held in position by rivets 4. Brake band end brackets 5 and 6 are fastened to the ends of the brake band 2 by welding, rivets or the like. Anchor bracket 7 is connected to one side of the transmission case 12 and has a rearwardly extending portion adapted to bear against the outer side of brake band end bracket 5. Connected to the opposite side of the transmission case 12 is brake support bracket 10 having a rearwardly extending portion 10b adapted to overlie the brake band end bracket 6. Threaded into this rearwardly extending portion 10b of brake support bracket 10 is an adjustable anchor bolt 11 adapted to have its inner end seat against the outer side of end bracket 6 so as to provide for adjustment between the brake band 2 and the anchor brackets 7 and 10. Lock nut 14 is threaded on adjustable anchor bolt 11 and may be turned up against the brake support bracket flange 10b to lock the bolt 11 in adjusted position so as to prevent the brake band 2 from turning with the brake drum 1. Due to the adjustability of the anchor bolt 11, it is possible to vary the time within which the brake will begin to take effect after actuation of the brake apply linkage. The bolt 11 thus controls the amount of lost motion in the brake applying linkage. Spring supporting arms 8 are mounted on transmission case 12 by bolts 13. The rearwardly extending end portions of arms 8 are connected to eyes 9 intermediate the ends of band 2. Arms 8 hold the band 2 out of contact with drum 1 when the brake is in inoperative position. The free ends of the brake band 2 are adapted to be drawn together by means of a compression bolt 16 which is actuated by operating levers 22. The bolt 16 passes through openings in the brake band end brackets 5 and 6 and has its threaded end inserted through an opening in spacer member 17. A notched nut 19 is threaded on the end of bolt 16 to lock the spacer member 17 on the bolt, a notch in nut 19 engaging an edge of spacer 17 to prevent rotation of the nut on bolt 16. The free ends of the brake band 2 are normally held out of contact with the brake drum 1 by the compression spring 15 which is threaded on bolt 16 so as to extend between the brake band end brackets 5 and 6. Support bracket 10, at its forward lower edge, is provided with an outwardly extending flange portion 10a. Pinned to the upper and lower sides of flange 10a, by clevis pin 20, are rearwardly extending lever links 21. Mounted between these lever links 21, at the rear ends thereof, are a pair of bell crank operating levers 22. Seated between these bell crank operating levers 22, adjacent their pivot points, is the spacer member 17 carrying the threaded end of the compression bolt 16. Clevis pin 23 pivotally connects the rear ends of the lever links 21 to the bell crank operating levers 22 and the spacer member 17.

When it is desired to apply a braking force to the brake drum 1, the lever arms 22b of the bell crank operating levers 22 are pivoted forwardly about pivot clevis pin 23. This moves the cam surfaces 22a of operating levers 22 against the outer side portion 6a of brake band end bracket 6 and this simultaneously causes the headed end of bolt 16 to draw brake band end bracket 5 towards the operating levers 22 and also causes brake band end bracket 6 to be cammed towards brake band end bracket 5. This simultaneous movement of the ends of the brake band 2 towards each other wraps the brake band 2 about the brake drum 1 and produces a braking effect.

Due to the brake band 2 being anchored to the transmission case 12 only at its end portions, our brake construction provides a brake in which the entire inner surface of the brake band 2 wraps about the brake drum 1 and thereby produces an improved, reliable brake, regardless of the direction of rotation of the brake drum. In our construction, by having substantially twice as much effective braking area as that normally provided in a brake construction in which the brake band is anchored to the supporting case at its mid-length, as well as at its end portions, it is obvious that a superior brake is provided. Furthermore, for a desired braking effect our construction permits the use of a smaller size brake than that required to produce the same braking effect with the conventional construction having the brake band anchored at its mid-length as well as at its end portions.

In order to prevent slip or reduction in braking effect between the brake band 2 and the brake drum 1, as the brake is applied, our construction incorporates a compensating spring device which maintains the brake band 2 tight about the brake drum 1 during the application of, as well as after, the braking action has been applied. It has been found that when a brake of this type is applied through the conventional hand lever having locking teeth, first the band 2 grips the drum 1 and then after application of the band to the drum there is a slight reduction in gripping effect as the hand lever seats in its selected tooth position. This slight release in grip between the band and drum has a tendency to produce a slight slip or reduction in braking effect between the band and the drum. To prevent this reduction in braking effect our compensating spring device has been applied between the brake cable 30 which actuates the brake and the lever arms 22b of the bell crank operating levers 22. The actuating cable 30 is connected to one end of a threaded bolt member 31 the other end of which extends through a hole in one end of a yoke member 32. Mounted on the bolt member 31, within the yoke member 32, is a stiff, high rate, compensating spring 33 having a rate of deformation of approximately 800 pounds per inch. Spring 33 is held on bolt member 31 by means of a washer and nut 34. The rear end of yoke member 32 is pivotally connected to the ends of lever arms 22b of operating levers 22 by means of clevis pin 35. This compensating spring device is such that when a force is applied to actuating cable 30 by the conventional hand lever so as to apply a braking effect to the brake drum 1, this force is transmitted through the compensating spring 33 to the lever arms 22b of the bell crank operating levers 22. In transmitting this braking force the compensating spring 33 is slightly compressed and as the brake band 2 is wrapped about brake drum 1 any slip which might tend to develop, due to the reduction in braking effect as the hand lever seats in its selected locking tooth, is absorbed by the compressed compensating spring 33. This compensating unit thereby maintains the brake band 2 taut about the brake drum 1 at all times during and after application of the braking force.

Thus it will be seen from the above description of our brake construction that not only have we provided an improved and simplified form of brake in which the brake band completely wraps around the brake drum, regardless of the direction of rotation of the brake drum, but in addition we have provided a compensating spring unit in combination with the full wrap brake which maintains the brake band taut about the brake drum at all times during application of a braking force.

We claim:

1. In a braking mechanism, a support, a rotatable brake drum, a brake band surrounding said brake drum and having spaced, relatively movable end portions adapted to be rigidly anchored to said support during application of the brake, a bracket having an opening therein secured to each end of said brake band, a bolt extending through said openings and connecting said brackets, a compression spring mounted on said bolt so as to extend between said brackets to urge said band end portions apart, lever operated cam means mounted on said bolt between the outer side of one of said brackets and an end of said bolt, a nut threaded on said bolt to hold said cam means against the bracket adjacent thereto and providing means for the adjustment of the stress in said spring and the normal clearance between said band and said drum, lever links connecting said cam means to said support, means connected to said lever link operated cam means operable to contract said brake band about said brake drum to produce a braking effect and an adjustably mounted bolt carried by said support having an end portion adapted to engage the outer side of one of said brackets to provide for adjustment of the actuation time required to apply the brake band to the drum.

2. In a braking mechanism, a brake support, a rotatable brake drum, a lined brake band surrounding said brake drum and having spaced, relatively movable end portions one of which is adapted to be rigidly anchored to said support during application of the brake, spring supporting arms mounted on said support and connected to said brake band intermediate its ends arranged to urge said brake band out of engagement with said drum, a bracket having an opening therein secured to each end of said brake band, a bolt extending through said openings and connecting said brackets, a compression spring mounted on said bolt and extending between said brackets urging the band end portions apart, lever operated cam means mounted on said bolt between the outer side of one of said brackets and an end of said bolt, a nut threaded on said bolt to hold said cam means against the bracket adjacent thereto and also serving as a tension adjusting means for said spring and a means for adjusting the normal clearance between the band and drum, a lever linkage connecting said cam means to said brake support, brake control means connected to said cam operated means actuable to contract said brake band about said brake drum to produce a braking effect, and means adjustably mounted on said support and engageable with a band end bracket for adjusting the time required for the brake band to take effect on the drum after initial actuation of the brake control means.

3. In a braking mechanism, a brake support, a rotatable brake drum, a lined brake band surrounding said brake drum and having spaced, relatively movable end portions one of which is adapted to be rigidly anchored to said support during application of the brake, spring supporting arms mounted on said support and connected to said brake band intermediate its ends arranged to urge said brake band out of engagement with said drum, a bracket having an opening therein secured to each end of said brake band, a bolt extending through said openings and connecting said brackets, a compression spring mounted on said bolt and extending between said brackets urging the band end portions apart, lever operated cam means mounted on said bolt between the outer side of one of said brackets and an end of said bolt, a nut threaded on said bolt to hold said cam means against the bracket adjacent thereto and also serving as a tension adjusting means for said spring and a means for adjusting the normal clearance between the band and drum, a lever linkage connecting said cam means to said brake support, brake control means connected to said cam operated means actuable to contract said brake band about said brake drum to produce a braking effect, means adjustably mounted on said support and engageable with a band end bracket for adjusting the time required for the brake band to take effect on the drum after initial actuation of the brake control means and resilient means connected to said brake control means adapted to maintain a constant force on said cam operated means during brake application to prevent slip between said band and said drum 4. A brake mechanism for motor vehicles comprising a transmission casing, a rotatable drive shaft carried by said casing, a brake drum mounted on said drive shaft, a brake band mounted around said brake drum having spaced, relatively movable ends, a brake band end bracket having a hole therein mounted on each end of said brake band, anchor brackets carried by said transmission casing having portions adapted to bear against said end brackets during application of the brake to anchor said band against rotation, means adjustably mounted on one of said anchor brackets having a portion engageable with one of said end brackets to provide for adjustment of the time required to apply said band to said drum, spring supporting arms mounted on said transmission casing and connected to said brake band intermediate its end portions to hold said band out of contact with said drum when the brake is released, a bolt extending through said openings in said end brackets, a compression spring carried by said bolt and extending between said end brackets to normally urge the brackets apart, lever operated cam means mounted on said bolt between the outer side of one of said end brackets and an end of said bolt, a nut threaded on said bolt to position said cam means against the end bracket adjacent thereto and to also serve as a tension adjusting means for said spring and as a means to adjust the clearance between the band and drum, a lever linkage connecting said cam means to one of said anchoring brackets, and control means connected to said cam operated means operable to contract said brake band about said brake drum to produce a braking effect.

5. A brake mechanism for motor vehicles comprising a transmission casing, a rotatable drive shaft carried by said casing, a brake drum mounted on said drive shaft, a brake band mounted around said brake drum having spaced apart, relatively movable ends, a brake band end bracket having a hole therein mounted on each end of said brake band, anchor brackets carried by said transmission casing and having portions adapted to bear against said end brackets during application of the brake band to the brake drum to anchor said band against rotation, spring supporting arms mounted on said transmission casing and connected to said brake band intermediate its end portions to hold said band out of contact with said drum when the brake is released, a bolt extending through said openings in said band end brackets and connecting said end brackets, a compression spring carried by said bolt and extending between said end brackets adapted to urge said band ends apart to a brake released position, lever operated cam means mounted on said bolt between the outer side of one of said end brackets and an end of said bolt, a nut threaded on said bolt to position said cam means against the end bracket adjacent thereto and to also serve as a tension adjusting means for said spring and a means to adjust the clearance between the band and the drum in band released position, a lever linkage connecting said cam means to one of said anchoring brackets, control means connected to said cam operated means operable to contract said brake band about said brake drum to apply the brake, and an adjustably mounted bolt carried by one of said anchor brackets engageable with one of the end brackets on said band to permit adjustment of the time required for the band to be effectively applied to said drum after operation of the control means.

6. In a brake assembly, a support, a rotatable brake drum, a brake band substantially surrounding said brake drum and having spaced apart, relatively movable end brackets each of which is pierced by an opening, a pair of anchor brackets mounted on said support, one of said anchor brackets being positioned adjacent each end bracket so as to provide means adapted to be engaged with said end brackets to provide a rigid anchor for said brake band when the brake band is applied to the brake drum, resilient members suspending said band from said support, a first bolt extending through said openings in said end brackets so as to connect the ends of said band, resilient means mounted on said bolt and extending between said end brackets to urge the end brackets apart to release said brake band from said drum, cam means mounted on said bolt and connected to said support adapted to be actuated so as to move said end brackets towards each other to apply said band to said drum, means associated with said first bolt to vary the force exerted by said resilient means and to control the normal clearance between said band and drum, and a second bolt threadably mounted in one of said anchor brackets having portions engageable with one of said end brackets to provide for adjustment of the time required the band to brake said drum after actuation of the cam means.

WM. R. RODGER.
JAMES D. CANNON.

REFERENCES CITED

The following references are of record in the file of this patent:

UNITED STATES PATENTS

| Number | Name | Date |
|---|---|---|
| 654,142 | Dunn | July 24, 1900 |
| 1,419,371 | Gentry et al. | June 13, 1922 |
| 1,613,713 | Mann | Jan. 11, 1927 |
| 1,941,167 | Fishburn | Dec. 26, 1933 |
| 2,423,575 | Beezley | July 8, 1947 |

FOREIGN PATENTS

| Number | Country | Date |
|---|---|---|
| 58,164 | Sweden | Mar. 16, 1923 |